(12) United States Patent
Carter et al.

(10) Patent No.: US 8,064,800 B2
(45) Date of Patent: Nov. 22, 2011

(54) COMPOSITE TORQUE TRANSFER BODY AND SPLINE ASSEMBLY TO REDUCE JITTER IN AN IMAGE FORMING DEVICE

(75) Inventors: Daniel Lee Carter, Georgetown, KY (US); Larry Steven Foster, Lexington, KY (US); Benjamin Keith Newman, Lexington, KY (US); Harald Portig, Versailles, KY (US); Lowell Thomas Siders, Nicholasville, KY (US); Brian Reed Spencer, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 495 days.

(21) Appl. No.: 12/191,971

(22) Filed: Aug. 14, 2008

(65) Prior Publication Data
US 2010/0041485 A1 Feb. 18, 2010

(51) Int. Cl.
*G03G 15/00* (2006.01)
(52) U.S. Cl. .................. 399/167; 74/DIG. 10
(58) Field of Classification Search .......... 399/110, 399/167; 74/439, 443, 447, 451, DIG. 10; 474/161
See application file for complete search history.

(56) References Cited

U.S. PATENT DOCUMENTS

| | | | | |
|---|---|---|---|---|
| 2,857,777 | A | * 10/1958 | Porter | 74/DIG. 10 |
| 5,307,705 | A | * 5/1994 | Fenelon | |
| 5,947,852 | A | 9/1999 | Moretz | |
| 6,397,029 | B1 | * 5/2002 | Portig | 399/167 |
| 7,130,562 | B2 | 10/2006 | Foster et al. | |

OTHER PUBLICATIONS

Beer et al, Mechanics of Materials, New York, McGraw-Hill Book Co., pp. 39 & 584, 1981.*

* cited by examiner

*Primary Examiner* — Gregory Binda

(57) ABSTRACT

A composite torque transfer body and spline assembly includes a torque transfer component made of a first material and having a central body portion and a peripheral torque transfer portion integrally attached to and extending about the central body portion, a spline component made of a second material different from and having stiffness greater than that of the first material of the torque transfer component and also having an elongated tubular spline portion and a collar portion integrally attached to and extending about and radially outward from an end of the spline portion, and a plurality of elements on the central body portion of the torque transfer component and the collar portion of the spline component providing separate press-fitting and securing of the components to one another such that the components are mated and rotatable together about a central axis.

19 Claims, 4 Drawing Sheets

COMPOSITE TORQUE TRANSFER BODY AND SPLINE ASSEMBLY TO REDUCE JITTER IN AN IMAGE FORMING DEVICE

BACKGROUND

1. Field of the Invention

The present invention relates generally to image forming devices and, more particularly, to a composite torque transfer body and spline assembly to reduce jitter or banding in an image forming device.

2. Description of the Related Art

In one type of image forming devices, namely electrophotographic or laser printers manufactured and marketed by Lexmark International Inc., the developer unit of the cartridge is driven through an Oldham coupler, which allows for misalignment between the printer drive gear and the input drive gear of the developer unit. Oldham couplers have been employed for many years in drive connections of diverse machines for transferring torque or rotary power between two parallel but non-collinear and/or non-radially aligned rotating shafts. One drive connection employing an Oldham coupler in such manner in a laser printer is illustrated and described in FIGS. 3, 4A and 4B and column four of U.S. Pat. No. 7,130,562, assigned to the assignee of the present invention.

In the past, the drive gearbox of the printer has employed a gear driven retraction spline mechanism with all-plastic parts. These parts though present in FIGS. 4A and 4B of the above-cited patent are not numerically-identified therein. The retraction spline mechanism in the patent includes a gear, an input coupler at the drive input end of the Oldham coupler and a retraction spring disposed between the gear and the input coupler and surrounding spline parts on the gear and input coupler where mating and expansion and retraction of the gear driven retraction spline mechanism occurs. This design was found to be torsionally weak from the standpoint of stiffness of the drive system. The drive splines and bosses are known to deflect or oscillate under load. The torsional deflection has been shown to contribute toward creating a natural frequency in the drive system for the developer roller that, when excited, causes the developer roller to oscillation such that it produces banding at 0.7 mm spacing on the printed page. Mono or color printers seem to be sensitive to low frequency oscillations of the drive system. This can cause "fine line" jitter in the range of 0.5 to 2 mm, in the form of light and dark areas, on the printed page as the drive system oscillates.

In the past, composite gear designs have been proposed in which a polymeric torque transfer body is mechanically associated with a metal drive member in some manner with the objective of increasing the stiffness and torque transfer capabilities of the gear assembly. For example, a composite gear design of this general description is disclosed in U.S. Pat. No. 5,947,852. In this composite gear design, the metal and plastic hub and sprocket parts are clamped against a shoulder on a shaft that extends through the metal and plastic parts by bolts that pass through aligned holes in the metal and plastic parts and are then threaded into the shoulder on the shaft. While the approach of this patent might be sufficient in the types of applications contemplated therein, it would not appear to provide sufficient stiffening in an application such as the gear driven retraction spline mechanism of a printer.

Thus, there is still a need for an innovation that will stiffen the gear driven retraction spline mechanism enough to eliminate fine line jitter.

SUMMARY OF THE INVENTION

The present invention meets this need by providing an innovation in the form of a composite torque transfer body and spline assembly which, when used in the gear driven retraction spline mechanism, measures to be at least two times stiffer than the original all-plastic gear driven retraction spline mechanism. This allowed a sufficiently stiff drive system to substantially eliminate fine line jitter by raising the natural frequency of the drive system.

Accordingly, in an aspect of the present invention, a composite torque transfer body and spline assembly includes a torque transfer component made of a first material and having a central body portion and a peripheral torque transfer portion attached to and extending about the central body portion, a spline component made of a second material different from and having stiffness greater than that of the first material of the torque transfer component and also having an elongated tubular spline portion and a collar portion attached to and extending about and radially outward from the spline portion, and a plurality of elements on the central body portion of the torque transfer component and the collar portion of the spline component providing separate press-fitting and securing of the components to one another such that the components are mated and rotatable together about a common longitudinally-extending central axis.

In another aspect of the present invention, a composite torque transfer body and spline assembly includes a torque transfer component made of a plastic material and having a central body portion and a peripheral torque transfer portion attached to and extending about the central body portion, a spline component made of a metal material having stiffness greater than that of the plastic material of the torque transfer component and also having an elongated tubular spline portion and a collar portion attached to and extending about and radially outward from the spline portion, and a plurality of elements on the central body portion of the torque transfer component and the collar portion of the spline component providing press-fitting and fastening of the components to one another such that the components are mated and rotatable together about a common longitudinally-extending central axis.

In a further aspect of the present invention, a composite torque transfer body and spline assembly includes a torque transfer component made of a molded plastic material and having a central body portion and a peripheral torque transfer portion attached to and extending about the central body portion, a spline component made of a cast metal material and having an elongated tubular spline portion and a collar portion attached to and extending about and radially outward from the spline portion, and a plurality of elements on the central body portion of the torque transfer component and the collar portion of the spline component providing a multiple segmented press-fitting and securing of the components to one another such that the components are mated and rotatable together about a common longitudinally-extending central axis.

BRIEF DESCRIPTION OF THE DRAWINGS

Figure 1:
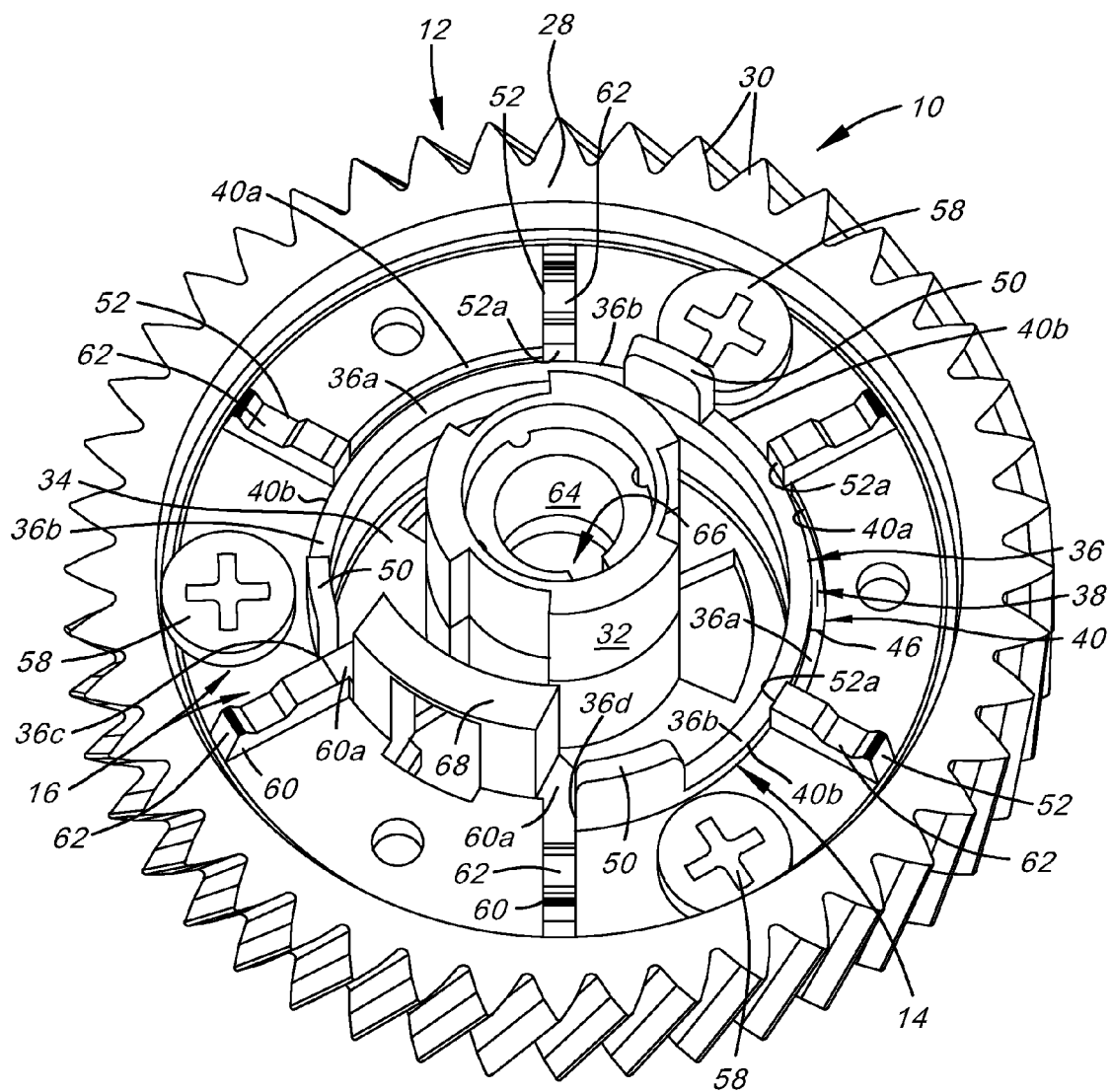

Having thus described the invention in general terms, reference will now be made to the accompanying drawings, which are not necessarily drawn to scale, and wherein:

FIG. 1 is a perspective view of a composite torque transfer body and spline assembly embodying the present invention.

Figure 2:
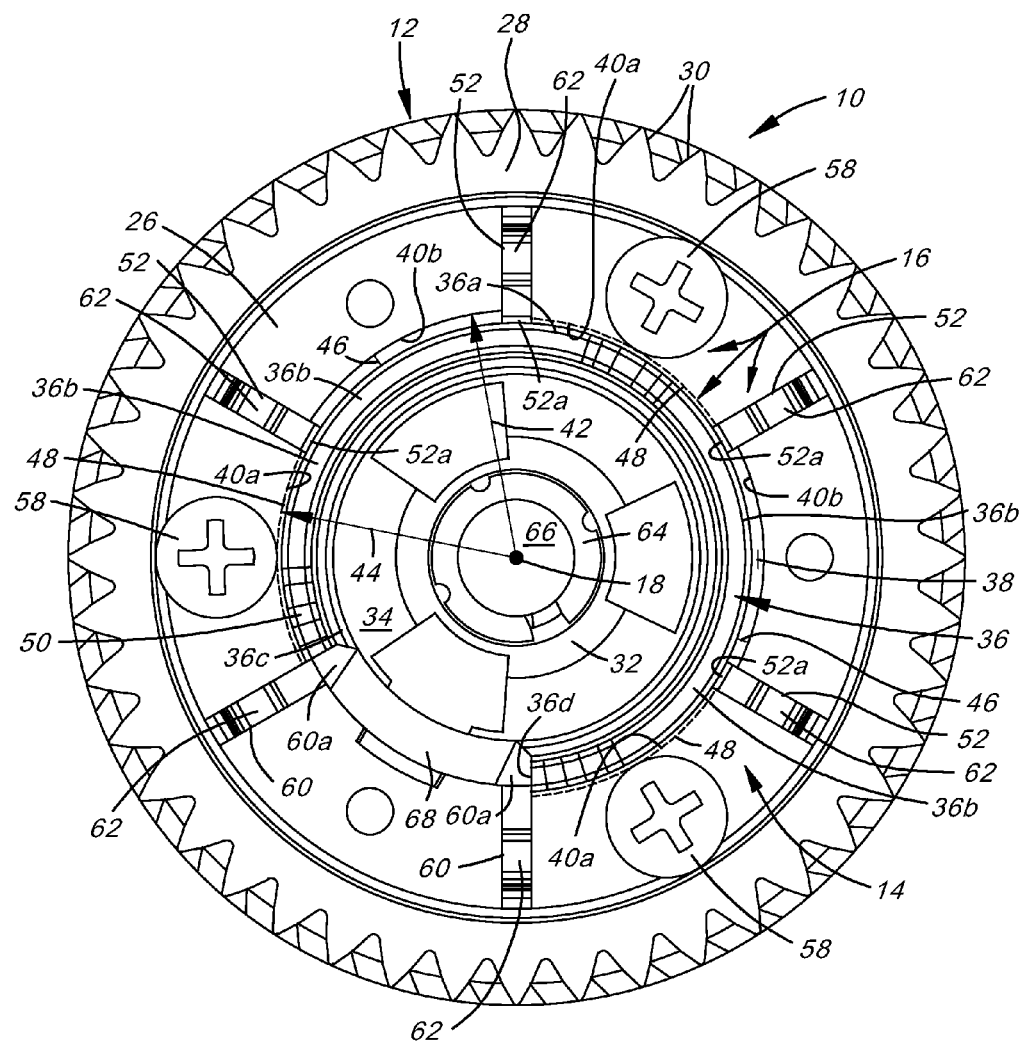

FIG. 2 is a front elevational view of the assembly of FIG. 1.

Figure 3:
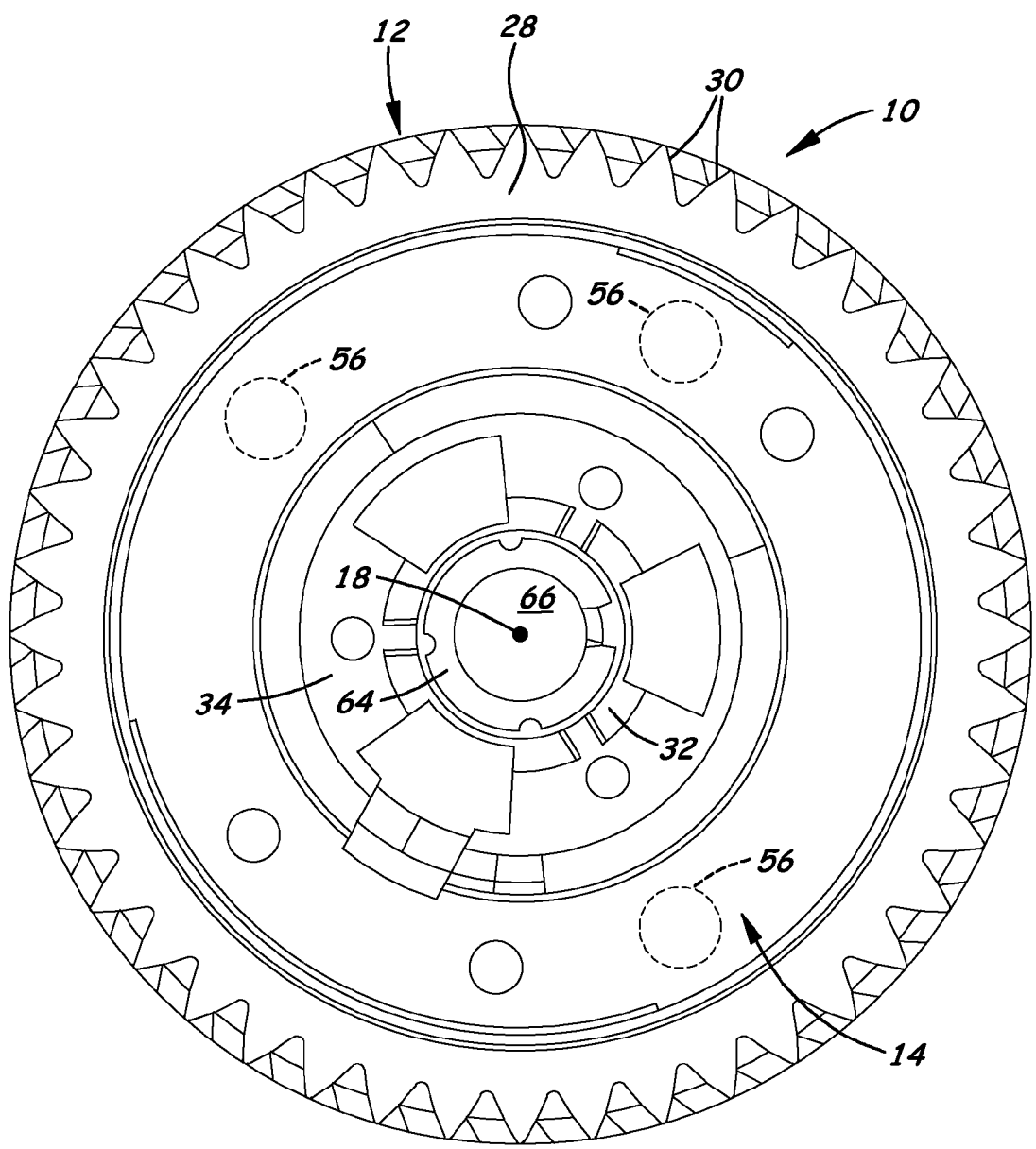

FIG. 3 is a rear elevational view of the assembly of FIG. 1.

Figure 4:
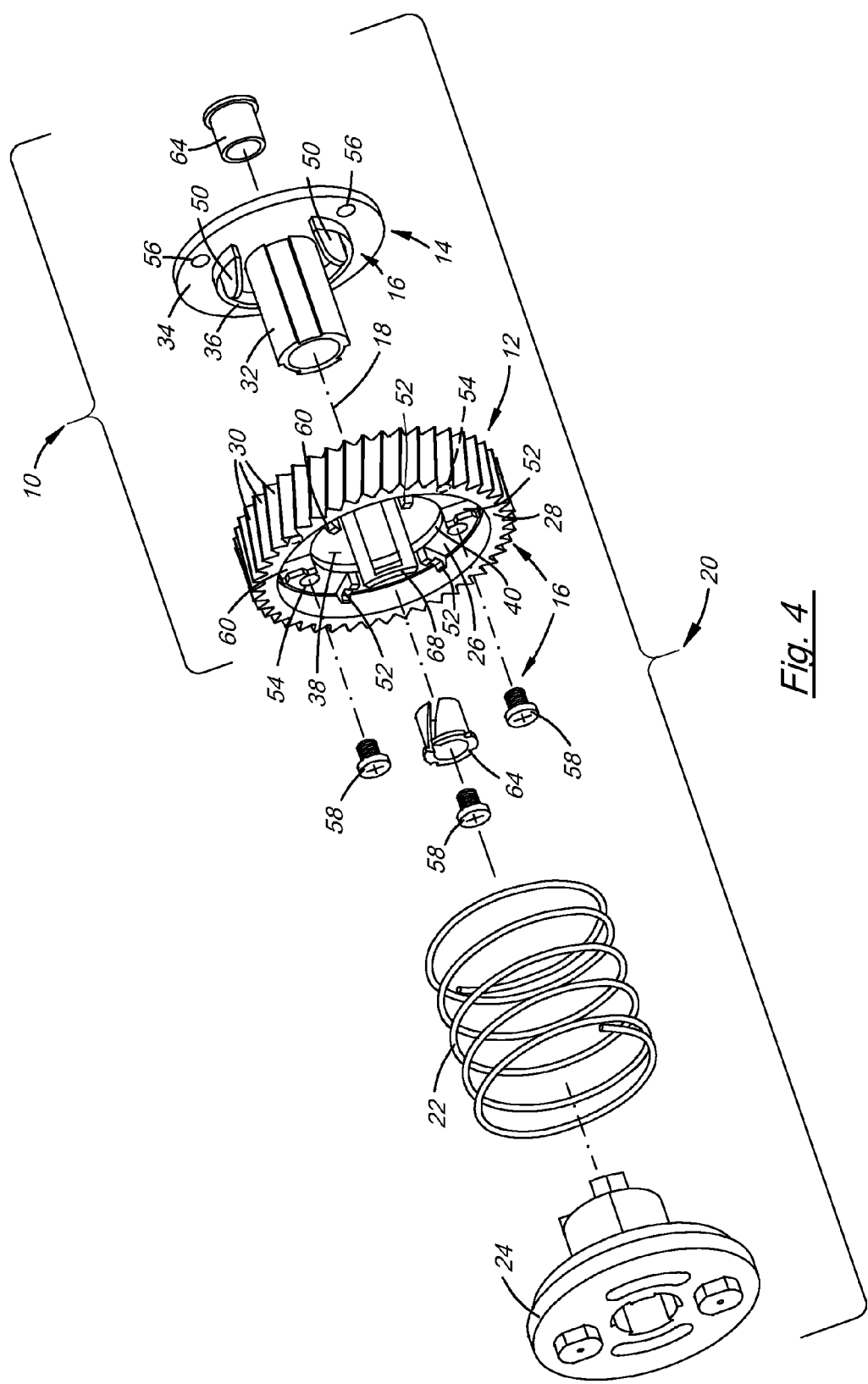

FIG. 4 is an exploded perspective view of a composite gear driven retraction spline mechanism incorporating the composite torque transfer body and spline assembly.

DETAILED DESCRIPTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numerals refer to like elements throughout the views.

Referring now to FIGS. 1-4 of the drawings, there is illustrated a composite torque transfer body and spline assembly, generally designated 10, embodying the present invention. The assembly 10 basically includes a torque transfer component 12 press-fitted and fastened to a spline component 14 and a plurality of elements, generally designated 16, located both on the torque transfer and spline components 12, 14 and providing separate press-fitting and securing of the components 12, 14 to one another such that the components 12, 14 are mated and rotatable together about a common longitudinally-extending central axis 18. A practical application for the composite torque transfer body and spline assembly 10 is in a composite gear driven retraction spline mechanism 20, as shown in FIG. 4, in which it interfaces with a retraction spring 22 and an input drive coupler 24 of an Oldham coupling and would provide enhanced performance over the all-plastic gear driven retraction spline mechanism illustrated in the aforementioned U.S. Pat. No. 7,130,562.

The torque transfer component 12 of the assembly 10 is made of a first material, such as a molded plastic material, selected from the group consisting of acetal, Nylon, Nylon with glass, ABS, and the like. Preferably, the first material is acetal. The torque transfer component 12 has a central body portion 26 and a peripheral torque transfer portion 28, such as in the form of an endless row of torque transfer teeth 30 as shown, or alternatively in other applications a belt groove or the like (not shown). The peripheral torque transfer portion 28 is fixedly and integrally attached to and extends about the central body portion 26. The central body portion 26, substantially annular and planar in configuration, together with the peripheral torque transfer portion 28, substantially circular in configuration, provides the torque transfer component 12 with a substantially circular configuration.

The spline component 14 of the assembly 10 is made of a second material different from the first material of the torque transfer component 12 in that the second material has stiffness greater than that of the first material. By way of example, the greater stiffness of the second material over that of the first material can provide the composite torque transfer body and spline assembly 10 with stiffness ranging from approximately 5 in-oz/degree to 50 in-oz/degree. The second material can be one selected from the group consisting of zinc, steel, aluminum, magnesium, glass-filled plastic, brass and bronze. Preferably, the second material of the spline component 14 is cast zinc which can be readily manufactured and provides the desired stiffness at relatively low cost. The spline component 14 has an elongated tubular spline portion 32 and a collar portion 34 rigidly and integrally attached to and extending about and radially outward from one end 32a of the spline portion 32. The collar portion 34, substantially annular in configuration, together with the spline portion 32, substantially cylindrical in configuration, provides the spline component 14 with a substantially circular configuration.

The plurality of elements 16 of the assembly 10 are located on the central body portion 26 of the torque transfer component 12 and the collar portion 34 of the spline component 14 so as to provide a separate multiple segmented press-fitting and securing of the components 12, 14 to one another. One of the elements 16 which contributes to the multiple segmented press-fitting between the components 12, 14 is a large diameter press ring 36, substantially arcuate in configuration and concentric about the central axis 18 of the assembly 10. The press ring 36 is rigidly and integrally attached on the collar portion 34 of the spline component 14 at a location spaced radially outward from the spline portion 32 and protrudes perpendicularly from the collar portion 34 along and partially about the central axis 18 of the assembly 10.

Another of the elements 16 which contributes to the multiple segmented press-fitting between the components 12, 14 is an opening 38 defined by an edge 40 having an arcuate configuration substantially concentric about the central axis 18 and formed in the central body portion 26 of the torque transfer component 12. The opening 38 is adapted to receive the press ring 36 therethrough such that at least portions of the edge 40 press-fit with portions of the press ring 36. More particularly, the edge 40 of the opening 38 has multiple first and second edge segments 40a, 40b which alternate with one another at the distances of first and second radii 42, 44, as seen in FIG. 2, from the central axis 18 and in a symmetrical relation about the central axis 18. The multiple first edge segments 40a are radially offset outwardly from the multiple second edge segments 40b relative to the central axis 18 so as to provide clearances (or gaps) 46 between first portions 36a of the press ring 36 and the multiple first edge segments 40a and provide press-fit contact areas along dashed lines 48, as seen in FIG. 2, between the multiple second edge segments 40b and second portions 36b of the press ring 36 alternately with the clearances 46 such that the clearances 46 and press-fit contact areas 48 are symmetrically and concentrically arranged about the central axis 18 when the press ring 36 is received through the opening 38. These multiple, namely three in number, contact areas 48 that are symmetrically placed provide a uniform press fit to the components 12, 14. This also aids in achieving a concentric assembly. Using a full-diameter press fit would not be as effective at holding the concentricity of the assembly 10 as material may be shaved out during the press fit process. Also, there are tabs 50 rigidly attached at opposite ends 36c, 36d of the press ring 36 and another tab 50 rigidly attached at the middle of the press ring 36 which all protrude axially therefrom and are tapered slightly inwardly so as to provide guides to enable inserting the press ring 36 through the opening 38 to assemble the components 12, 14 with one another.

Still another of the elements 16 of the assembly 10 which contributes to the multiple segmented press-fitting between the components 12, 14 is a plurality of radial ribs 52 fixedly or integrally attached on the central body portion 26 of the torque transfer component 12, extending in a radial relationship relative to the central axis 18 of the assembly 10, and protruding perpendicularly from the central body portion 26. The ribs 52 extend between the peripheral torque transfer portion 28 and opposite ends of the edge segments 40a, 40b. Inner ends 52a of the ribs 52 together with the multiple second edge segments 40b are press-fitted with second portions 36b of the press ring 36 when the press ring 36 is received through the opening 38. The radial ribs 52 serve to stiffen the plastic central body portion 26 of the torque transfer component 12 in the press fit contact areas 48, without affecting its peripheral torque transfer portion 28 since the radial ribs 52 do not contact the peripheral torque transfer portion 28 and thus do not interfere with the backsides of the torque transfer teeth 30 of the torque transfer portion 28 which could cause sink marks or tooth distortion. The locations of the ribs 52 allow them to provide stiffening of the component 12 against the high stress that occurs at the ends of the three press fit contact areas 48.

Yet another of the elements 16 which provide the securing and, more particularly, multiple fastening of the components is a plurality of threadless holes 54 defined in the central body portion 26 of the torque transfer component 12 and a plurality of threaded holes 56 defined in the collar portion 34 of the spline component 14. The sets of hole 54, 56 are alignable with one another such that a plurality of screws 58 are insertable through the threadless holes 54 and threadable into the threaded holes 56 to fasten the components 12, 14 with one another. As best seen in FIGS. 1, 2 and 4, the press ring 36 is a discontinuous, in other words not completely cylindrical, terminating at opposite ends 36c, 36d. The elements 16 providing press-fitting of the components further include another pair of the radial ribs 60 attached on the central body portion 26 of the torque transfer component 12 and spaced apart from one another such that the ribs 60 have inner ends 60a extending a short distance beyond the edge 40 so as to define stops located between, adjacent to and one of which in contact with the corresponding one of the opposite ends 36c, 36d of the press ring 36 depending on the direction of rotation of the spline component 14, so as to enhance drive torque transfer from the spline component 14 to the torque transfer component 12 by preventing rotation of the press ring 36 relative to the edge 40 and about the central axis 18 and thereby substantially preventing torque transfer through the screws 58 which might otherwise over time loosen or damage the screws 58. Thus, the location of the ribs 60 ensures a solid drive engagement that does not pull on the screws 58 during drive in the drive direction. The screws 58 thus ensure a good clamping force between the components 12, 14. This gives the forgiving plastic component movement in the area of the torque transfer teeth 30 for less jitter while providing stiffening of the weak central body portion 26 of the component 12 by securely fastening it to the collar portion 34 of the metal spline component 14. Thus, the design of the assembly 10 uses screws 58 to ensure a tight connection between the plastic and metal components 12, 14 but does not rely on screw tightness to ensure transmission of drive torque.

In view that the radial ribs 52, 60 are involved in press-fitting with the press ring 36, strengthening the central body portion 26 of the torque transfer component 12, providing stops for one or the other of the opposite ends 36c, 36d of the press ring 36 depending upon the direction of rotation of the spline component 14, the ribs can be viewed as multifunctional. The ribs 52, 60 further define a plurality of outer seats 62 which aid in locating the retraction spring 22 of the mechanism 20 and act as dividers between the three screws 58 and three press fit contact areas 48.

The assembly 10 further includes a two-part bushing 64 which may be of a material different from the materials of the components 12, 14. The bushing 64 is adapted to mount centrally in the bore 66 through spline component 14 for receiving and mounting the spline component 14 on a rotatable member (not shown). Preferably the bushing 64 is made of a material, such as Nylon, although it can be made of the same material, such as acetal. This third composite material, Nylon, of the bushing 64 ensures a long wear life in the area that rotates on the shaft member. The assembly 10 also has superstructure 68 attached on the central body portion 26 of the plastic component 12 offset from the opening 38 therethrough to provide a snap-fittable sliding drive coupling on to spline portion 32 during assembling of the printer gearbox.

To summarize, the present invention provides a composite torque transfer body and spline assembly 10 which, in one exemplary embodiment thereof, is made of a molded plastic torque transfer component 12 and a cast metal spline component 14. The composite torque transfer body and spline assembly 10 is provided in a composite gear driven retraction spline mechanism 20 implemented at the output of a printer gearbox that drives an input gear of a developer unit through an Oldham coupler coupled to the retraction spline mechanism 20. In order to achieve increased torsional stiffness of the composite gear driven retraction spline mechanism 20 which is needed to prevent amplification of the resonance frequency of the developer unit drive system, the cast metal spline component 14 is joined to the molded plastic gear component 12 by elements 16 which provide multiple segmented press fitting and multiple fastening of the components 12, 14 of the composite torque transfer body and spline assembly 10 together. The metal spline component 14 is made from a suitable metal material that is very stiff and low in cost to produce, such as cast zinc or similar high stiffness metal.

Dynamic analysis and testing have shown that substantial stiffening of the spline section of the Oldham coupler changes the natural frequency of the developer unit drive system, which in turn substantially eliminates visible jitter on a printed page due to the developer unit resonance. Compared to the prior art all-plastic one-piece gear and spline unit, such as found in the previously-cited U.S. Pat. No. 7,130,562, the composite torque transfer body and spline assembly 10 of the present invention demonstrates a substantial elimination of jitter approaching about 0.7 mm. The structural elements employed by the present invention in the attachment of the cast metal spline component 14 and the molded plastic component 12 control the location of the cast metal spline component 14 on the molded plastic component 12 and firmly secure the components together in a manner that will transmit high torque loads required to drive the developer unit. The torque transfer component 12 is made of plastic in order to run in mesh with the driving gear in the printer gearbox, without causing wear to the driving gear, for quiet operation and at low cost.

It should be understood that, instead of screws 58, alternative means of securing can be utilized, such as heat staking or overmold of the torque transfer component 12 on the spline component 14. Also the spline portion 32 can have other cross-sectional shapes.

The foregoing description of one or more embodiments of the invention has been presented for purposes of illustration. It is not intended to be exhaustive or to limit the invention to the precise forms disclosed, and obviously many modifications and variations are possible in light of the above teaching. It is intended that the scope of the invention be defined by the claims appended hereto.

What is claimed is:

1. A composite torque transfer body and spline assembly, comprising:
   a torque transfer component made of a first material and having a central body portion and a peripheral torque transfer portion attached to and extending about said central body portion;
   a spline component made of a second material different from and having stiffness greater than that of said first material of said torque transfer component, said spline component having an elongated tubular spline portion and a collar portion attached to and extending about and radially outward from said spline portion; and
   a plurality of elements on said central body portion of said torque transfer component and said collar portion of said spline component providing separate press-fitting and securing of said components to one another such that said components are mated and rotatable together about a common longitudinally-extending central axis, wherein said elements providing press-fitting of said components include:
  a press ring having an arcuate configuration substantially concentric about said central axis and attached on said collar portion of said spline component at a location spaced radially outward from said spline portion; and
  an opening defined by an edge having an arcuate configuration substantially concentric about said central axis and formed in said central body portion of said torque transfer component for receiving said press ring such that at least portions of said edge press-fit with portions of said press ring.

2. The assembly of claim 1 wherein said second material of said spline component provides said assembly with stiffness ranging from approximately 5 in-oz/degree to 50 in-oz/degree.

3. The assembly of claim 1 wherein said second material of said spline component comprises one selected from the group consisting of zinc, steel, aluminum, magnesium, glass-filled plastic, brass and bronze.

4. The assembly of claim 1 wherein said first material of said torque transfer component comprises one selected from the group consisting of acetal, Nylon, Nylon with glass and ABS.

5. The assembly of claim 1 wherein said edge of said opening has multiple first and second edge segments which alternate with one another about said central axis such that said multiple first edge segments are radially offset outwardly from said multiple second edge segments relative to said central axis so as to provide clearances between first portions of said press ring and said multiple first edge segments and press-fit contact areas between said multiple second edge segments and second portions of said press ring alternately with said clearances such that said clearances and press-fit contact areas are symmetrically and concentrically arranged about said central axis when said press ring is received through said opening.

6. The assembly of claim 5 wherein said elements providing press-fitting of said components further include a plurality of ribs attached on said central body portion of said torque transfer component and extending radially relative to said central axis and between said peripheral torque transfer portion and opposite ends of said edge segments such that inner ends of said ribs together with said edge segments are press-fitted with said press ring when said press ring is received through said opening.

7. The assembly of claim 5 wherein said press ring is discontinuous having a pair of spaced apart opposite ends and said elements providing press-fitting of said components further include a pair of ribs attached on said central body portion of said torque transfer component and spaced apart from one another, said ribs having inner ends extending beyond said edge so as to define stops located between, adjacent to and one or the other of which being in contact with a corresponding one of said opposite ends of said press ring, depending upon the direction of rotation of said spline component, so as to enhance transfer of torque from said spline component to said torque transfer component by preventing rotation of said press ring relative to said edge and about said central axis.

8. The assembly of claim 1 wherein said press ring has tabs thereon spaced apart from one another and protruding from said press ring and configured so as to provide guides to enable inserting said press ring through said opening.

9. The assembly of claim 1 wherein said elements providing press-fitting of said components further include a plurality of radial ribs attached on said central body portion of said torque transfer component and extending radially relative to said central axis and between said peripheral torque transfer portion and said edge and circumferentially spaced from one another about said central axis, said ribs providing strengthening of said central body portion of said torque transfer component and further defining outer seats for locating a retraction spring, said ribs terminating short of reaching said peripheral torque transfer portion so as to not make contact therewith and thereby not transfer any forces generated by said press-fitting of said components together to said peripheral torque transfer portion.

10. A composite torque transfer body and spline assembly, comprising:
  a torque transfer component made of a plastic material and having a central body portion and a peripheral torque transfer portion attached to and extending about said central body portion;
  a spline component made of a metal material different from and having stiffness greater than that of said plastic material of said torque transfer component, said spline component having an elongated tubular spline portion and a collar portion attached to and extending about and radially outward from said spline portion; and
  a plurality of elements on said central body portion of said torque transfer component and said collar portion of said spline component providing press-fitting and fastening of said components to one another such that said components are mated and rotatable together about a common longitudinally-extending central axis, wherein said elements providing press-fitting of said components include:
    a press ring having an arcuate configuration substantially concentric about said central axis and attached on said collar portion of said spline component at a location spaced radially outward from said spline portion, said press ring being discontinuous having a pair of spaced apart opposite ends; and
    an opening defined by an edge having an arcuate configuration substantially concentric about said central axis and formed in said central body portion of said torque transfer component for receiving said press ring such that at least portions of said edge press-fit with portions of said press ring.

11. The assembly of claim 10 wherein said elements providing fastening of said components include:
  a plurality of threadless holes defined in said central body portion of said torque transfer component;
  a plurality of threaded holes defined in said collar portion of said spline component; and
  a plurality of screws insertable through said threadless holes and threadable into said threaded holes to screw-fasten said components with one another.

12. The assembly of claim 11 wherein said elements providing press-fitting of said components further include a pair of ribs attached on said central body portion of said torque transfer component and spaced apart from one another, said ribs having inner ends extending beyond said edge so as to define stops located between, adjacent to and one or the other of which being in contact with a corresponding one of said opposite ends of said press ring so as to enhance torque transfer from said spline component to said torque transfer component by preventing rotation of said press ring relative to said edge and about said central axis and thereby substantially preventing said torque transfer through said screws.

13. The assembly of claim 10 further comprising:
a bushing of a material different from said materials of said components and adapted to mount centrally in said spline portion of said spline component and concentrically about said central axis for receiving and mounting said spline component of said mated components on a rotatable member.

14. A composite torque transfer and spline assembly, comprising:
a torque transfer component made of a molded plastic material and having a central body portion and a peripheral torque transfer portion integrally attached to and extending about said central body portion;
a spline component made of a cast metal material and having an elongated tubular spline portion and a collar portion integrally attached to and extending about and radially outward from said spline portion; and
a plurality of elements on said central body portion of said torque transfer component and said collar portion of said spline component providing a separate multiple segmented press-fitting and securing of said components to one another such that said components are mated and rotatable together about a common longitudinally-extending central axis, wherein said elements providing said multiple segmented press-fitting of said components include:
a press ring having an arcuate configuration substantially concentric about said central axis and attached on said collar portion of said spline component at a location spaced radially outward from said spline portion; and
an opening defined by an edge having an arcuate configuration substantially concentric about said central axis and formed in said central body portion of said torque transfer component and adapted to receive said press ring such that at least portions of said edge press-fit with portions of said press ring.

15. The assembly of claim 14
wherein said edge of said opening has multiple first and second edge segments which alternate with one another about said central axis such that said multiple first edge segments are radially offset outwardly from said multiple second edge segments relative to said central axis so as to provide clearances between first portions of said press ring and said multiple first edge segments and press-fit contact areas between said multiple second edge segments and second portions of said press ring alternately with said clearances such that said clearances and press-fit contact areas are symmetrically and concentrically arranged about said central axis when said press ring is received through said opening.

16. The assembly of claim 15 wherein said elements providing press-fitting of said components further include a plurality of ribs attached on said central body portion of said torque transfer component and extending radially relative to said central axis and between said peripheral torque transfer portion and opposite ends of said edge segments such that inner ends of said ribs together with said edge segments are press-fitted with said press ring when said press ring is received through said opening.

17. The assembly of claim 16 wherein said elements providing said fastening of said components to one another includes:
a plurality of threadless holes defined in said central body portion of said torque transfer component;
a plurality of threaded holes defined in said collar of said spline component; and
a plurality of screws insertable through said threadless holes and threadable into said threaded holes to screw fasten said components to one another.

18. The assembly of claim 17 wherein said press ring is discontinuous having a pair of spaced apart opposite ends and said elements providing press-fitting of said components further include a pair of ribs attached on said central body portion of said torque transfer component and spaced apart from one another, said ribs having inner ends extending beyond said edge so as to define stops located between, adjacent to and one or the other of which being in contact with a corresponding one of said opposite ends of said press ring, depending upon the direction of rotation of said spline component, so as to enhance torque transfer from said spline component to said torque transfer component by preventing rotation of said press ring relative to said edge and about said central axis and thereby substantially preventing said torque transfer through said screws.

19. The assembly of claim 15 wherein said elements providing press-fitting of said components further include a plurality of ribs attached on said central body portion of said torque transfer component and extending radially relative to said central axis and between said peripheral torque transfer portion and said edge and circumferentially spaced from one another about said central axis, said ribs providing strengthening of said central body portion of said torque transfer component and further defining outer seats for locating a retraction spring, said ribs terminating short of reaching said peripheral torque transfer portion so as to not make contact therewith and thereby not transfer any forces generated by said press-fitting of said components to said peripheral torque transfer portion.

* * * * *